(12) United States Patent
Inoue

(10) Patent No.: US 10,910,922 B2
(45) Date of Patent: Feb. 2, 2021

(54) STATOR, THERMISTOR FIXING STRUCTURE AND THERMISTOR FIXING METHOD

(71) Applicant: HONDA MOTOR CO., LTD., Tokyo (JP)

(72) Inventor: Masashi Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/278,781

(22) Filed: Feb. 19, 2019

(65) Prior Publication Data

US 2019/0267872 A1    Aug. 29, 2019

(30) Foreign Application Priority Data

Feb. 26, 2018  (JP) ................................ 2018-032263

(51) Int. Cl.
  *H02K 11/25*     (2016.01)
  *H02K 3/38*      (2006.01)
  (Continued)

(52) U.S. Cl.
  CPC ............... *H02K 11/25* (2016.01); *H02K 1/16* (2013.01); *H02K 3/38* (2013.01); *H02K 3/48* (2013.01);
  (Continued)

(58) Field of Classification Search
  CPC ...... H02K 1/16; H02K 11/25; H02K 15/0062; H02K 15/105; H02K 3/12; H02K 3/38; H02K 3/48; H02K 3/50
  (Continued)

(56) References Cited

U.S. PATENT DOCUMENTS

| | | | |
|---|---|---|---|
| 2002/0089085 A1* | 7/2002 | Kim ...................... | H01F 27/327 264/272.18 |
| 2012/0086292 A1* | 4/2012 | Ishida .................... | H02K 11/25 310/71 |

(Continued)

FOREIGN PATENT DOCUMENTS

| | | |
|---|---|---|
| CN | 1282970 | 2/2001 |
| JP | 04-179019 | 6/1992 |

(Continued)

OTHER PUBLICATIONS

Japanese Office Action for Japanese Patent Application No. 2018-032263 dated Nov. 5, 2019.
(Continued)

*Primary Examiner* — Tulsidas C Patel
*Assistant Examiner* — Rashad H Johnson
(74) *Attorney, Agent, or Firm* — Amin, Turocy & Watson, LLP

(57) ABSTRACT

A stator includes a middle point coil of a winding accommodated in slots of a stator core and mounted on the stator core, a thermistor configured to detect a temperature of the middle point coil of the winding, and insulating paper that is wound on the thermistor and an outer circumference of the middle point coil of the winding and both side portions of the insulating paper being adhered with each other, and that is configured to fix the thermistor to the middle point coil of the winding while the thermistor is in a contact state with the middle point coil of the winding.

9 Claims, 9 Drawing Sheets

(51) Int. Cl.
  *H02K 3/50* (2006.01)
  *H02K 3/48* (2006.01)
  *H02K 15/00* (2006.01)
  *H02K 1/16* (2006.01)
  *H02K 15/10* (2006.01)
  *H02K 3/12* (2006.01)

(52) U.S. Cl.
  CPC ........... *H02K 3/50* (2013.01); *H02K 15/0062* (2013.01); *H02K 15/105* (2013.01); *H02K 3/12* (2013.01)

(58) Field of Classification Search
  USPC ................................................ 310/68 C, 71
  See application file for complete search history.

(56) References Cited

U.S. PATENT DOCUMENTS

2012/0293037 A1* 11/2012 Uchida .................. H02K 3/487
                                                    310/214
2013/0320817 A1* 12/2013 Marschall .......... H02K 11/0094
                                                    310/68 C
2014/0015367 A1* 1/2014 Umehara ................. H02K 3/12
                                                    310/208
2018/0337580 A1* 11/2018 Baba ...................... H02K 11/25

FOREIGN PATENT DOCUMENTS

| | | |
|---|---|---|
| JP | 08-080011 | 3/1996 |
| JP | 2000-299967 | 10/2000 |
| JP | 2011-030288 | 2/2011 |
| JP | 2012-044773 | 3/2012 |
| JP | 2013-051806 | 3/2013 |
| JP | 6282791 | 2/2018 |

OTHER PUBLICATIONS

Japanese Notice of Allowance for Japanese Patent Application No. 2018-032263 dated Jan. 7, 2020.
Chinese Office Action for Chinese Patent Application No. 201910116584.1 dated Jul. 31, 2020.

* cited by examiner

STATOR, THERMISTOR FIXING STRUCTURE AND THERMISTOR FIXING METHOD

CROSS-REFERENCE TO RELATED APPLICATION

Priority is claimed on Japanese Patent Application No. 2018-032263, filed Feb. 26, 2018, the content of which is incorporated herein by reference.

BACKGROUND OF THE INVENTION

Field of the Invention

The present invention relates to a stator, a thermistor fixing structure and a thermistor fixing method.

Description of Related Art

In the related art, a rotary electric machine is used as a power source of a hybrid automobile or an electric automobile. The rotary electric machine includes a stator. The stator includes a stator core and a conductive body. The stator core has a slot. A conductive wire is accommodated in the slot and mounted on the stator core.

Incidentally, in the rotary electric machine, the conductive body generates heat during driving. In particular, when a load to the rotary electric machine is excessively large or the like, since a temperature of the conductive body may increase greatly, the temperature of the conductive body is preferably observed. In order to observe the temperature of the conductive body, a method of detecting a temperature of a conductive body using a thermistor may be provided.

For example, in a technology disclosed in Japanese Unexamined Patent Application, First Publication No. 2013-51806, a bracket is fixed to a casing of a rotary electric machine. An elastic arm formed of a metal extends from a main body of the bracket toward a coil end (a conductive body) of a stator. The elastic arm presses a thermistor against the coil end. Accordingly, the thermistor is fixed while coming in contact with the coil end.

SUMMARY OF THE INVENTION

However, in the technology disclosed in Japanese Unexamined Patent Application, First Publication No. 2013-51806, since there is a need to provide the bracket, an attachment space for the bracket is required. In addition, costs may be increased by providing the bracket. In this way, in the related art, there is room for improvement in improvement of layout properties and reduction in costs.

An aspect of the present invention is directed to providing a stator, a thermistor fixing structure and a thermistor fixing method that have a good layout property and in which a thermistor is able to be fixed at low cost, in comparison with in the related art.

(1) A stator according to an aspect of the present invention includes a conductive body accommodated in slots of a stator core and mounted on the stator core; a thermistor configured to detect a temperature of the conductive body; and insulating paper that is wound on the thermistor and an outer circumference of the conductive body and both side portions of the insulating paper being adhered with each other, and that is configured to fix the thermistor to the conductive body while the thermistor is in a contact state with the conductive body.

(2) In the aspect of (1), an adhesive agent may be provided on the both of the side portions of the insulating paper, and the both of the side portions of the insulating paper may be adhered with each other using the adhesive agent on the both sides.

(3) In the aspect of (1) or (2), a holder having an insulating property may be provided on an outer circumferential side of the insulating paper.

(4) A thermistor fixing structure according to another aspect of the present invention includes a conductive body accommodated in slots of a stator core and mounted on the stator core; a thermistor configured to detect a temperature of the conductive body; and insulating paper that is wound on the thermistor and an outer circumference of the conductive body and both side portions of the insulating paper being adhered with each other, and that is configured to fix the thermistor to the conductive body while the thermistor is in a contact state with the conductive body.

(5) A thermistor fixing method according to another aspect of the present invention includes a thermistor disposition process of disposing a thermistor to come in contact with a conductive body accommodated in slots of a stator core and mounted on the stator core; insulating paper winding process of wounding insulating paper on the thermistor and an outer circumference of the conductive body; and insulating paper adhering process of fixing the thermistor to the conductive body while the thermistor is in a contact state with the conductive body by adhering the both side portions of the insulating paper with each other.

(6) In the aspect of (5), the insulating paper adhering process is performed in which the both of the side portions of the insulating paper may be adhered with each other while being temporarily fixed to at least one of the thermistor and the conductive body.

(7) In the aspect of (5) or (6), the insulating paper adhering process is performed in which the both of the side portions of the insulating paper may be heated and cured after temporarily attaching the both of the side portions with each other by using a thermosetting adhesive agent, and the both of the side portions may be adhered with each other.

(8) In the aspect of (6) or (7), the insulating paper adhering process is performed in which the both of the side portions of the insulating paper may be clamped by a clamping section so as to be temporarily fixed after the both of the side portions of the insulating paper are made to overlap with each other.

(9) In the aspect of (6) or (7), the insulating paper adhering process is performed in which the both of the side portions of the insulating paper may be tightened by a fastening section so as to be temporarily fixed after the both of the side portions of the insulating paper are made to overlap with each other.

According to the aspect of (1), since the thermistor is fixed to the conductive body while the thermistor is made in a contact state with the conductive body and the both of the side portions of the insulating paper is wound on the thermistor and the outer circumference of the conductive body and the both of the side portions of the insulating paper are adhered with each other, the thermistor can be fixed to the conductive body without using a bracket like in the related art. Accordingly, the stator of the aspect of (1) has good layout property in comparison with the related art, and the thermistor can be fixed at low cost.

According to the aspect of (2), since the adhesive agent is provided on the both side portions of the insulating paper and the both of the side portions of the insulating paper are adhered with each other using the adhesive agent on the both sides, in comparison with the case in which an adhesive agent is provided on one of both of the side portions of insulating paper, both side portions can be strongly adhered to each other. Accordingly, in the stator of the aspect of (2), the thermistor can be securely fixed to the conductive body.

According to the stator of the aspect of (3), since the holder having an insulating property is provided on the outer circumferential side of the insulating paper, the thermistor can be securely fixed to the conductive body.

According to the thermistor fixing structure of the aspect of (4) and the thermistor fixing method of the aspect of (5), since the thermistor is fixed to the conductive body while the thermistor is made in a contact state with the conductive body and the insulating paper is wound on the thermistor and the outer circumference of the conductive body and the both side portions are adhered with each other, the thermistor can be fixed to the conductive body without using a bracket like in the related art. Accordingly, in the aspects of (4) and (5), layout properties are good in comparison with the related art, and the thermistor can be fixed at low cost.

According to the aspect of (6), in the insulating paper adhering process, since the both side portions of the insulating paper are adhered with each other while being temporarily fixed to at least one of the thermistor and the conductive body, both side portions of the insulating paper can be securely adhered to each other.

According to the aspect of (7), since the both side portions of the insulating paper are heated and cured after being temporarily adhered using the thermosetting adhesive agent and the both side portions are adhered with each other, both side portions of the insulating paper can be securely adhered to each other.

According to the aspect of (8), since the both side portions are clamped by the clamping section to be temporarily fixed after the both side portions of the insulating paper are made to overlap with each other, the both side portions of the insulating paper can be securely adhered to each other.

According to the aspect of (9), since the both side portions are fastened by the fastening section to be temporarily fixed after the both side portions of the insulating paper are made to overlap with each other, the both side portions of the insulating paper can be securely adhered to each other.

DETAILED DESCRIPTION OF THE INVENTION

Hereinafter, embodiments of the present invention will be described with reference to the accompanying drawings.

First Embodiment

Figure 1:
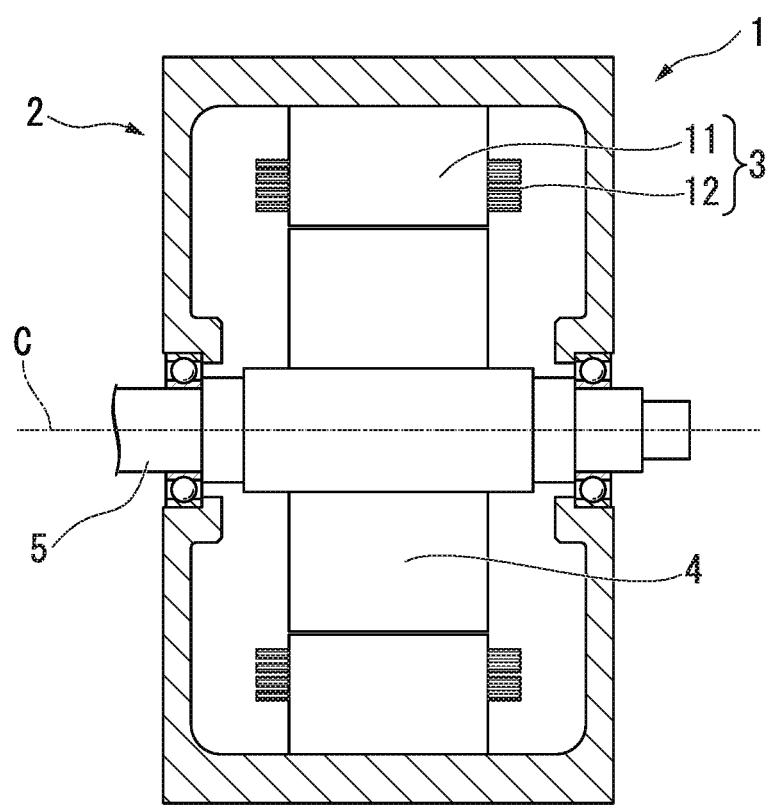
FIG. 1 is a cross-sectional view showing a schematic configuration of a rotary electric machine according to a first embodiment.

FIG. 1 is a cross-sectional view showing a schematic configuration of a rotary electric machine according to a first embodiment.

As shown in FIG. 1, a rotary electric machine 1 according to the embodiment includes a case 2, a stator 3, a rotor 4 and an output shaft 5.

The rotary electric machine 1 of the embodiment is a traveling motor mounted on a vehicle such as a hybrid automobile or an electric automobile. However, a configuration of the embodiment is not limited to the above-mentioned example and may also be a motor for another use such as a generating motor or the like mounted on a vehicle. In addition, the configuration of the embodiment can be applied to all of so-called rotary electric machines each including a generator in addition to a rotary electric machine mounted on a vehicle.

Further, in the following description, a direction along an axis C of a rotational center of the rotor 4 is referred to as an axial direction, a direction perpendicular to the axis C is referred to as a radial direction, and a direction around the axis C is referred to as a circumferential direction. In addition, in the following description, an upward/downward direction coincides with an upward/downward direction of a vertical direction.

The rotor 4 has, for example, a rotor core and magnets attached to the rotor core, which is driven to be rotated inside the stator 3.

The output shaft 5 is connected to the rotor 4, and outputs rotation of the rotor 4 as a driving force.

The stator 3 is formed in an annular shape, and for example, is attached to an inner circumferential surface of the case 2. The stator 3 has a stator core 11 and a winding 12 attached to the stator core 11, and applies a rotational magnetic field to the rotor 4.

Figure 2:
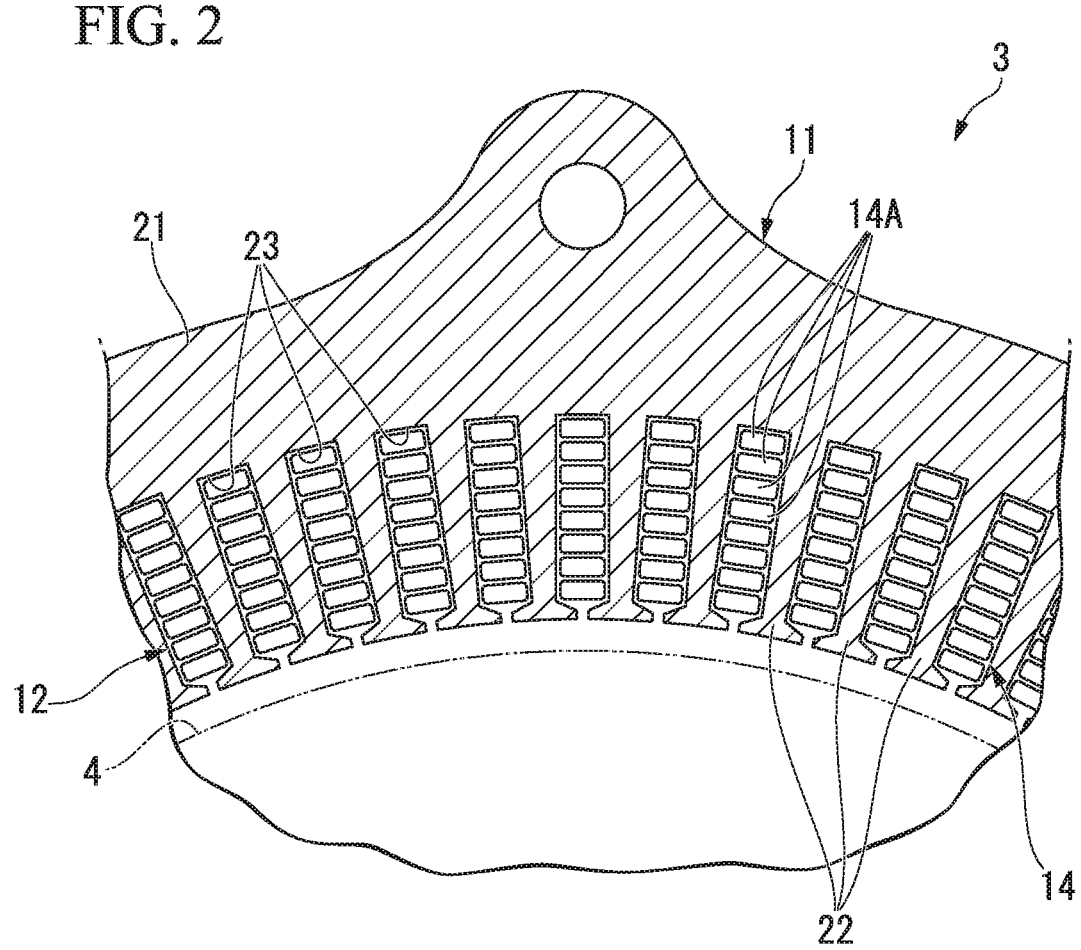
FIG. 2 is a cross-sectional view showing a part of a stator.

FIG. 2 is a cross-sectional view showing a part of the stator.

As shown in FIG. 2, the stator 3 includes the stator core 11 and the winding 12. Further, in the stator 3, while a resin layer or a filled in and adhered material such as varnish or the like may be further provided in slots 23, for the convenience of description in the application, illustration and description thereof will be omitted.

The stator core 11 is formed in an annular shape that surrounds the rotor 4. For example, the stator core 11 may be a separate type stator core obtained by connecting a plurality of pieces divided in the circumferential direction, or may be a laminated stator core formed by laminating a plurality of electromagnetic steel sheets in the axial direction.

The stator core 11 has an annular yoke section 21, a plurality of teeth sections 22 and a plurality of slots 23.

The plurality of teeth sections 22 protrude from the yoke section 21 toward an inner side of the stator core 11 in the radial direction.

Each of the slots 23 is formed between two teeth sections 22 neighboring in the circumferential direction of the stator core 11. For this reason, the plurality of slots 23 are disposed to be arranged in the circumferential direction of the stator core 11. Each of the slots 23 passes through the stator core 11 in the axial direction of the stator core 11. The slots 23 of the embodiment are open slots that open inward in the radial direction. Further, the configuration of the embodiment is not limited thereto and may also be applied to a closed slot, an inner side of which is closed inward in the radial direction.

The winding 12 is accommodated in the slots 23 of the stator core 11 and mounted on the stator core 11. The winding 12 is a conductive body of the embodiment. The winding 12 is a 3-phase coil constituted by a U phase, a V phase and a W phase. The winding 12 is constituted by a plurality of segment coils 14 that are connected to each other and used.

Figure 3:
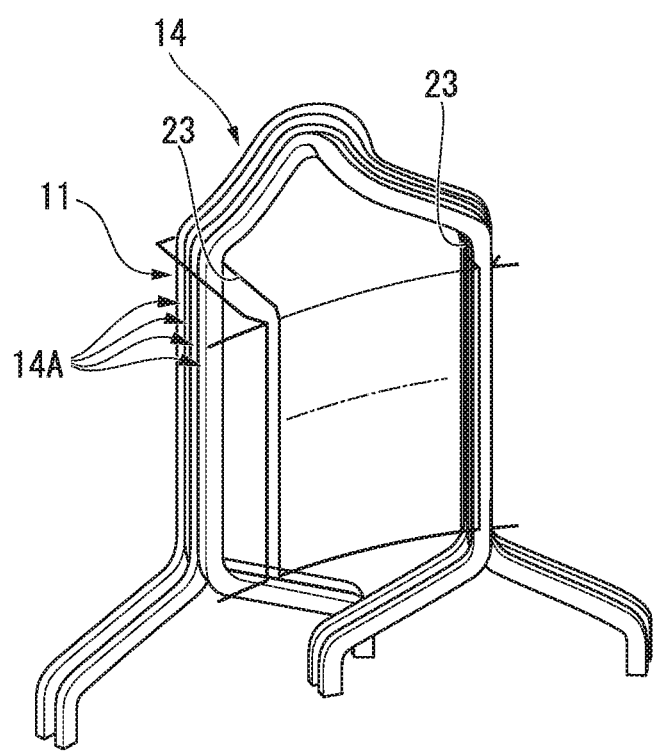
FIG. 3 is a perspective view showing segment coils.

FIG. 3 is a perspective view showing segment coils. Further, in FIG. 3, one segment coil 14 is shown, and another one segment coil accommodated in the same slot 23 is omitted. In addition, in FIG. 3, the segment coil is shown through the stator core 11.

As shown in FIG. 3, the segment coils 14 are constituted by a plurality of (for example, 4) conductive segment bodies 14A.

The conductive segment bodies 14A are formed in a U shape. Both side portions of the conductive segment bodies 14A are separate and accommodated in slots 23, which are different from each other, while being covered with insulating paper (not shown). The insulating paper is the same as insulating paper 7 (see FIG. 4 or the like) fixed to a thermistor 6 (to be described below) and used. Both end portions of the conductive segment bodies 14A are connected to both end portions of the conductive segment bodies 14A of another segment coil 14. Accordingly, the plurality of segment coils 14 are connected in sequence. The plurality of segment coils 14 are arranged in sequence of a U phase, a U phase, a V phase, a V phase, a W phase, a W phase, a U phase, a U phase . . . in the circumferential direction of the stator core 11.

Figure 4:
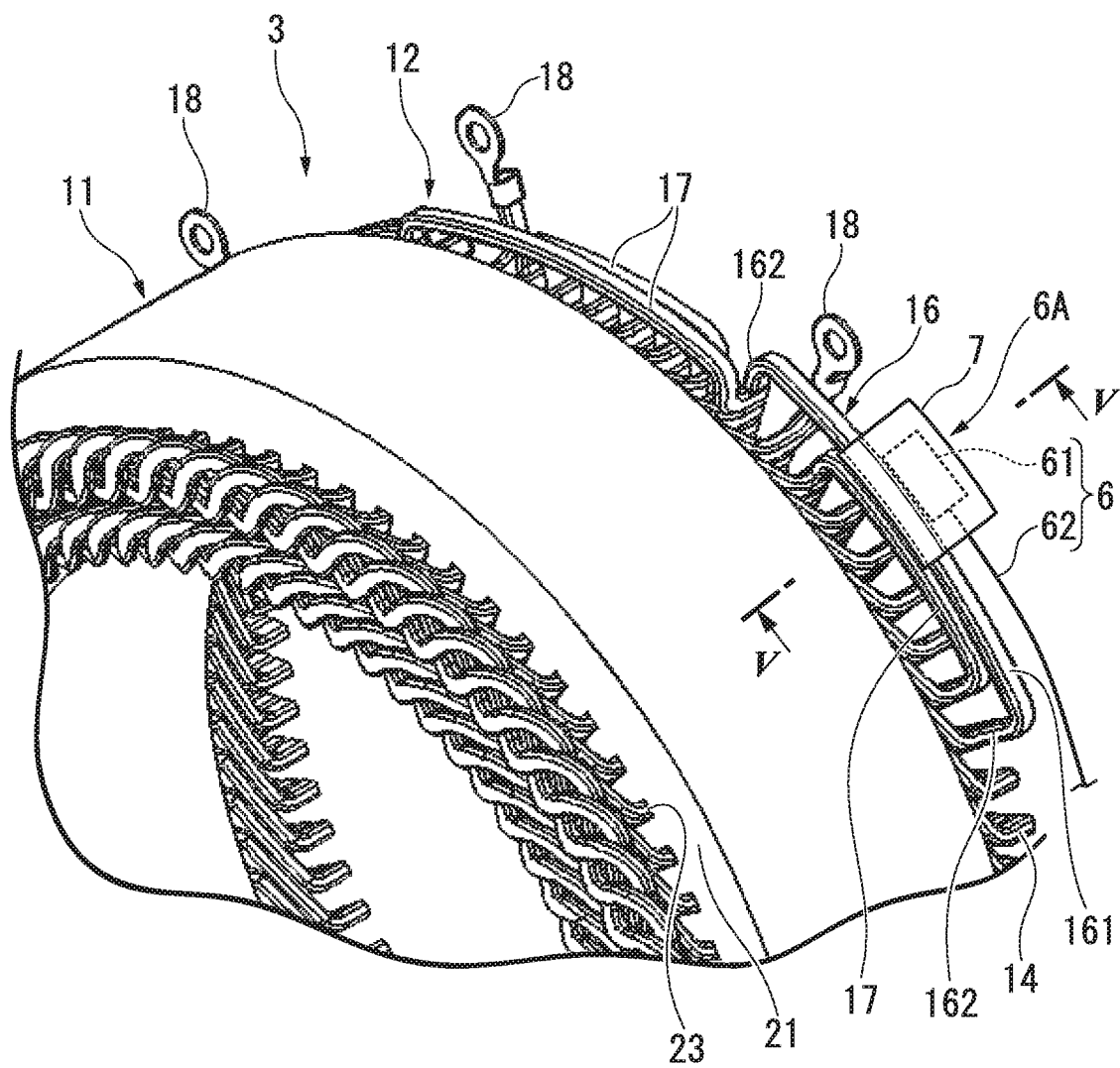
FIG. 4 is a perspective view showing a part of the stator.

FIG. 4 is a perspective view showing a part of the stator.

As shown in FIG. 4, the winding 12 includes a middle point coil 16, bridge coils 17 and pulling coils 18. The middle point coil 16 connects middle points (neutral points) of the coils (the plurality of segment coils 14) having phases. The bridge coils 17 connect the segment coils 14 having the same phase. One ends of the pulling coils 18 are connected to the segment coils 14 connected to a terminal block of an external power supply among the plurality of segment coils 14 having the phases. The other ends of the pulling coils 18 are connected to the terminal block of the external power supply.

The middle point coil 16 tends to reach a high temperature in comparison with other portions during electrical conduction. A temperature of the winding 12 is increased by generating heat through supply of electric power to the winding 12 during an operation of the rotary electric machine 1. The middle point coil 16 includes an extending section 161, and a pair of connecting sections 162 and 162. The extending section 161 is formed in an arc shape in the circumferential direction. The extending section 161 is disposed to be separated from an end surface of the yoke section 21 of the stator core 11. The extending section 161 extends in the circumferential direction of the end surface of the yoke section 21. The pair of connecting sections 162 and 162 are formed on both ends of the extending section 161. The pair of connecting sections 162 and 162 are connected to the middle point of the coil of each phase.

The stator 3 includes the thermistor 6 and the insulating paper 7. A thermistor fixing structure 6A of the embodiment fixes the thermistor 6 to the middle point coil 16 of the winding 12 using the insulating paper 7.

The thermistor 6 is configured to detect a temperature of the middle point coil 16, and comes in contact with the extending section 161 of the middle point coil 16. The insulating paper 7 fixes the thermistor 6 to the extending section 161 in a state in which the thermistor 6 comes in contact with the extending section 161.

Specifically, the thermistor 6 detects a temperature of the middle point coil 16 using variation in resistance value according to variation in temperature.

The thermistor 6 includes a detection part 61 and an output wire 62. The detection part 61 comes in close contact with the extending section 161. The detection part 61 detects a temperature of the middle point coil 16 and generates a detection signal. One end of the output wire 62 is connected to the detection part 61. The output wire 62 outputs a detection signal generated from the detection part 61 to the outside. The other end of the output wire 62 is connected to external equipment such as an electronic control unit (ECU) or the like. The external equipment acquires and observes a temperature of the middle point coil 16 on the basis of the detection signal output from the output wire 62.

Figure 5:
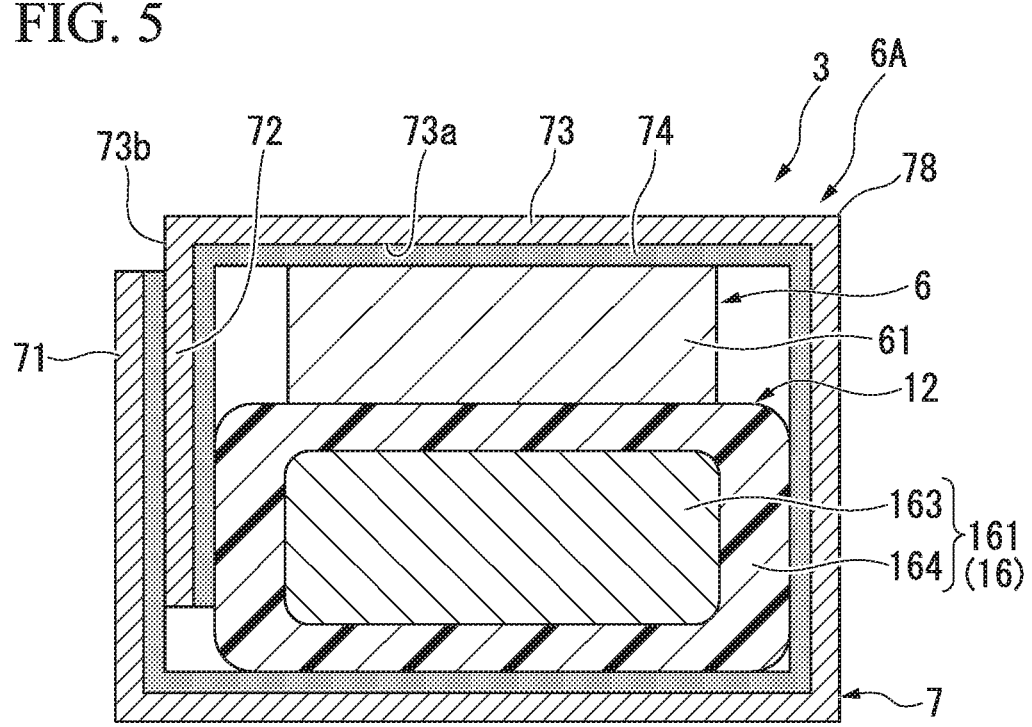
FIG. 5 is a cross-sectional view taken along line V-V in FIG. 4.

FIG. 5 is a cross-sectional view taken along line V-V in FIG. 4.

As shown in FIG. 5, the middle point coil 16 includes a core wire 163 and an insulating coating film 164 configured to cover the core wire 163. The core wire 163 has a cross section formed in a rectangular shape (a rectangular wire shape). The detection part 61 of the thermistor 6 has a cross section formed in a rectangular shape.

The insulating paper 7 is formed in a belt-like shape. The insulating paper 7 is wound on the detection part 61 of the thermistor 6 and an outer circumference of the extending section 161 of the middle point coil 16 to cross the extending section 161. Both of side portions 71 and 72 of the insulating paper 7 in a winding direction (the circumferential direction of the insulating paper 7) are adhered with each other while overlapping each other. Accordingly, the insulating paper 7 is fixed to the extending section 161 while being in a contact state with the detection part 61.

The insulating paper 7 is constituted by an insulating layer 73 and an adhesive layer 74. The insulating layer 73 is formed of a material having an insulating property, for example, a resin material or the like. The adhesive layer 74 is formed on the entire inner circumferential surface 73a of the insulating layer 73. The adhesive layer 74 is formed of a thermosetting adhesive agent, and is cured to exhibit an adhesive function when heated.

Both of the side portions 71 and 72 of the insulating paper 7 are adhered with each other using the adhesive layer 74 while overlapping each other. Specifically, one side portion 71 of both of the side portions 71 and 72 of the insulating paper 7 is disposed on an outer circumferential side. The other side portion 72 of both of the side portions 71 and 72 is disposed on an inner circumferential side. The inner circumferential side of the one side portion 71 of the insulating paper 7 is adhered to the outer circumferential side of the other side portion 72 of the insulating paper 7 using the adhesive layer 74.

Figure 6:
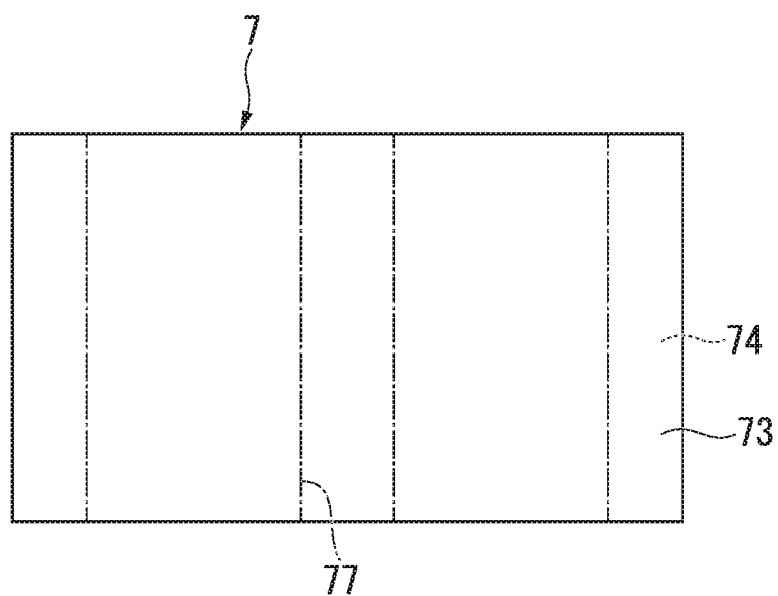
FIG. 6 is a plan view of insulating paper.

FIG. 6 is a plan view of the insulating paper. Further, the insulating paper 7 of FIG. 6 is shown in a state before folding.

Four folds 77 are provided on the insulating paper 7. The four folds 77 are provided to be separated from each other in the winding direction of the insulating paper 7. The four folds 77 are provided at positions corresponding to four folded sections 78 (see FIG. 5) of the insulating paper 7. The folds 77 extend in a direction perpendicular to the winding direction of the insulating paper 7. The insulating paper 7 has a cross section formed in a rectangular shape since the insulating paper 7 is folded on the side of the adhesive layer 74 along the four folds 77.

Next, a fixing method of the thermistor 6 using the insulating paper 7 will be described.

The fixing method of the thermistor 6 includes a thermistor disposition process, insulating paper winding process and insulating paper adhering process. Fixing work of the thermistor 6 is performed in a sequence of the above-mentioned processes.

In the thermistor disposition process, the detection part 61 of the thermistor 6 is disposed to come in close contact with the extending section 161 of the middle point coil 16.

Next, in the insulating paper winding process, first, the insulating paper 7 is folded toward the side of the adhesive layer 74 along the four folds 77. Next, in the insulating paper winding process, the folded insulating paper 7 is wound on the thermistor 6 and the outer circumference of the extending section 161 of the middle point coil 16.

Next, in the insulating paper adhering process, first, both of the side portions 71 and 72 of the insulating paper 7 are temporarily adhered with each other using the adhesive layer 74 (a thermosetting adhesive agent) while overlapping each other. Next, in the insulating paper adhering process, the insulating paper 7 is heated. Accordingly, the adhesive layer 74 is heated and cured, and both of the side portions 71 and 72 are adhered with each other. Accordingly, the detection part 61 of the thermistor 6 is fixed to the extending section 161 of the middle point coil 16 while being in a contact state with the extending section 161.

According to the stator 3, the thermistor fixing structure 6A and the thermistor fixing method of the embodiment, in a state in which the thermistor 6 comes in contact with the middle point coil 16 of the winding 12, since the thermistor 6 is fixed to the middle point coil 16 of the winding 12 by causing the insulating paper 7 to be wound on the thermistor 6 and the outer circumference of the middle point coil 16 of the winding 12 and attach both of the side portions 71 and 72 with each other, the thermistor 6 can be fixed to the middle point coil 16 of the winding 12 without using a bracket like in the related art. Accordingly, the stator 3 disclosed in the embodiment has good layout property in comparison with the related art, and the thermistor 6 can be fixed at low cost.

In addition, according to the thermistor fixing method of the embodiment, since both of the side portions 71 and 72 are adhered with each other by heating and curing both of the side portions 71 and 72 of the insulating paper 7 after temporarily attaching them using a thermosetting adhesive agent, both of the side portions 71 and 72 of the insulating paper 7 can be securely adhered with each other.

Second Embodiment

Figure 7:
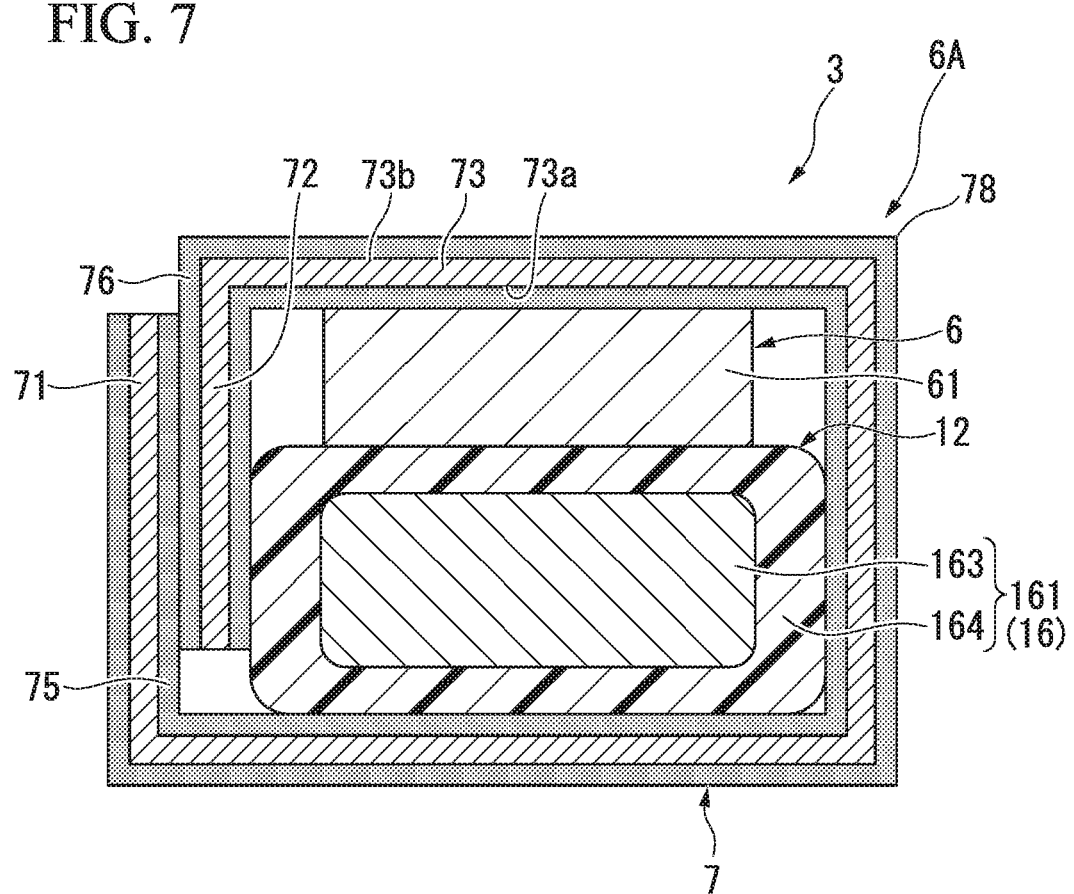
FIG. 7 is a cross-sectional view showing a thermistor fixing structure of a stator of a second embodiment.

FIG. 7 is a cross-sectional view showing a thermistor fixing structure of a stator of a second embodiment.

Next, the stator 3 of the second embodiment will be described with reference to FIG. 7. Further, detailed description of the same constitutions as in the first embodiment will be omitted.

The stator 3 of the second embodiment includes the stator core 11 (see FIG. 1 or the like), the winding 12, the thermistor 6 and the insulating paper 7.

The insulating paper 7 is constituted by the insulating layer 73, a first adhesive layer 75 and a second adhesive layer 76. The first adhesive layer 75 and the second adhesive layer 76 are formed of a thermosetting adhesive agent, like the adhesive layer 74 of the first embodiment. The first adhesive layer 75 is formed on the entire inner circumferential surface 73a of the insulating layer 73. The second adhesive layer 76 is formed on the entire outer circumferential surface 73b of the insulating layer 73.

The insulating paper 7 has the first adhesive layer 75 and the second adhesive layer 76 provided on both of the side portions 71 and 72 of the insulating paper 7, respectively. Both of the side portions 71 and 72 are adhered with each other using the first adhesive layer 75 and the second adhesive layer 76. Specifically, the first adhesive layer 75 is provided on an inner circumferential side of the one side portion 71. The second adhesive layer 76 is provided on an outer circumferential side of the other side portion 72. On both of the side portions 71 and 72, the inner circumferential side of the one side portion 71 and the outer circumferential side of the other side portion 72 are adhered using the first adhesive layer 75 and the second adhesive layer 76.

According to the stator 3 and the thermistor fixing structure 6A of the second embodiment, since the first adhesive layer 75 and the second adhesive layer 76 are provided on both of the side portions 71 and 72 of the insulating paper 7, respectively, and both of the side portions 71 and 72 are adhered with each other using the first adhesive layer 75 and the second adhesive layer 76, in comparison with the case in which an adhesive agent is provided on one of both of the side portions 71 and 72 of the insulating paper 7, both of the side portions 71 and 72 can be strongly adhered with each other. Accordingly, according to the stator 3 and the thermistor fixing structure 6A of the second embodiment, the thermistor 6 can be securely fixed to the middle point coil 16 of the winding 12.

Third Embodiment

Figure 8:
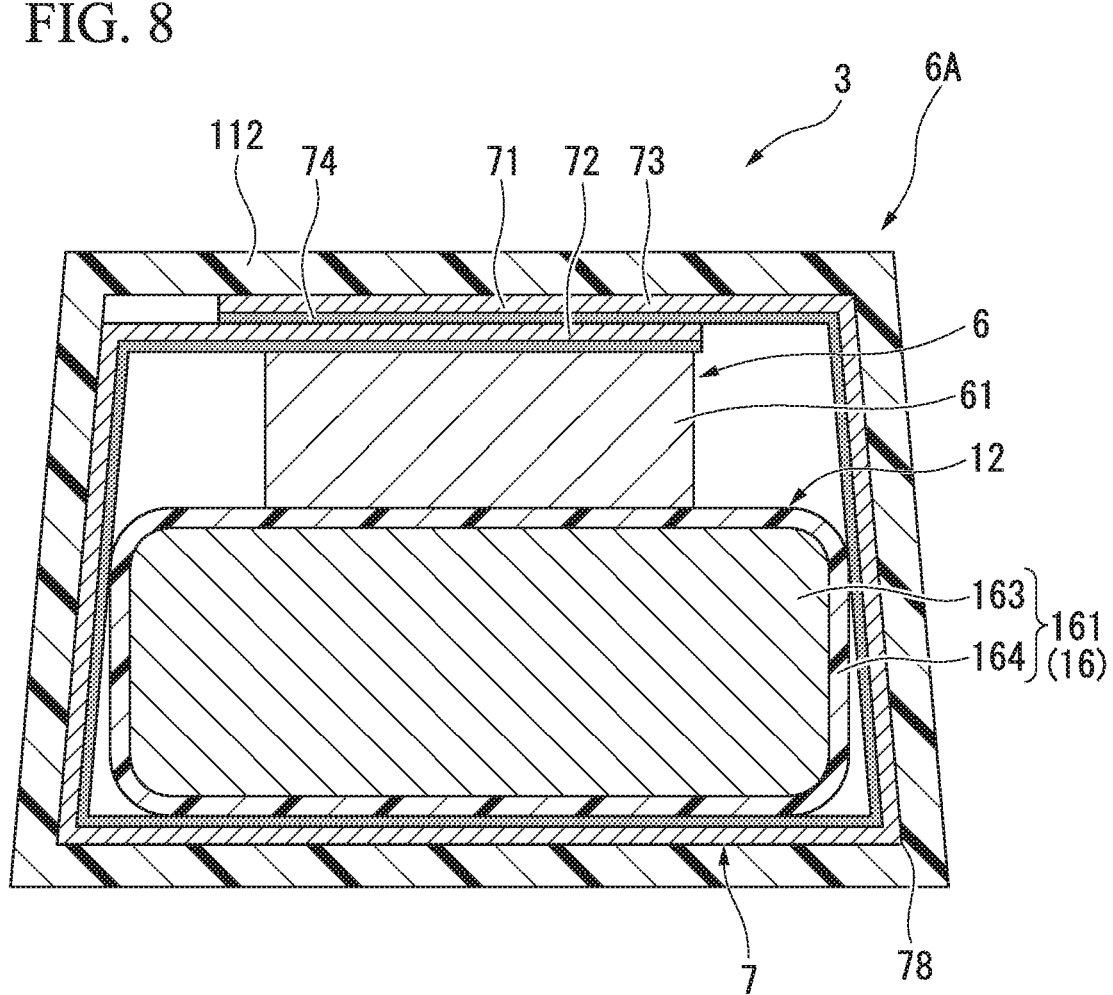
FIG. 8 is a cross-sectional view showing a thermistor fixing structure of a stator of a third embodiment.

FIG. 8 is a cross-sectional view showing a thermistor fixing structure of a stator of a third embodiment.

Next, the stator 3 of the third embodiment will be described with reference to FIG. 8. Further, detailed description of the same constitutions as that of the first embodiment will be omitted.

The stator 3 of the third embodiment includes the stator core 11 (see FIG. 1 or the like), the winding 12, the thermistor 6, the insulating paper 7 and a holder 112. The holder 112 is formed of a resin material having an insulating property, and a cross section thereof is formed in a rectangular cylindrical shape. The holder 112 is fitted onto an outer circumferential side of the insulating paper 7.

According to the stator 3 of the third embodiment, since the holder 112 having an insulating property is provided on an outer circumferential side of the insulating paper 7, the thermistor 6 can be securely fixed to the middle point coil 16 of the winding 12. In addition, an insulating property between the thermistor 6 and other parts around the middle point coil 16 can be reliably guaranteed.

Fourth Embodiment

Figure 9:
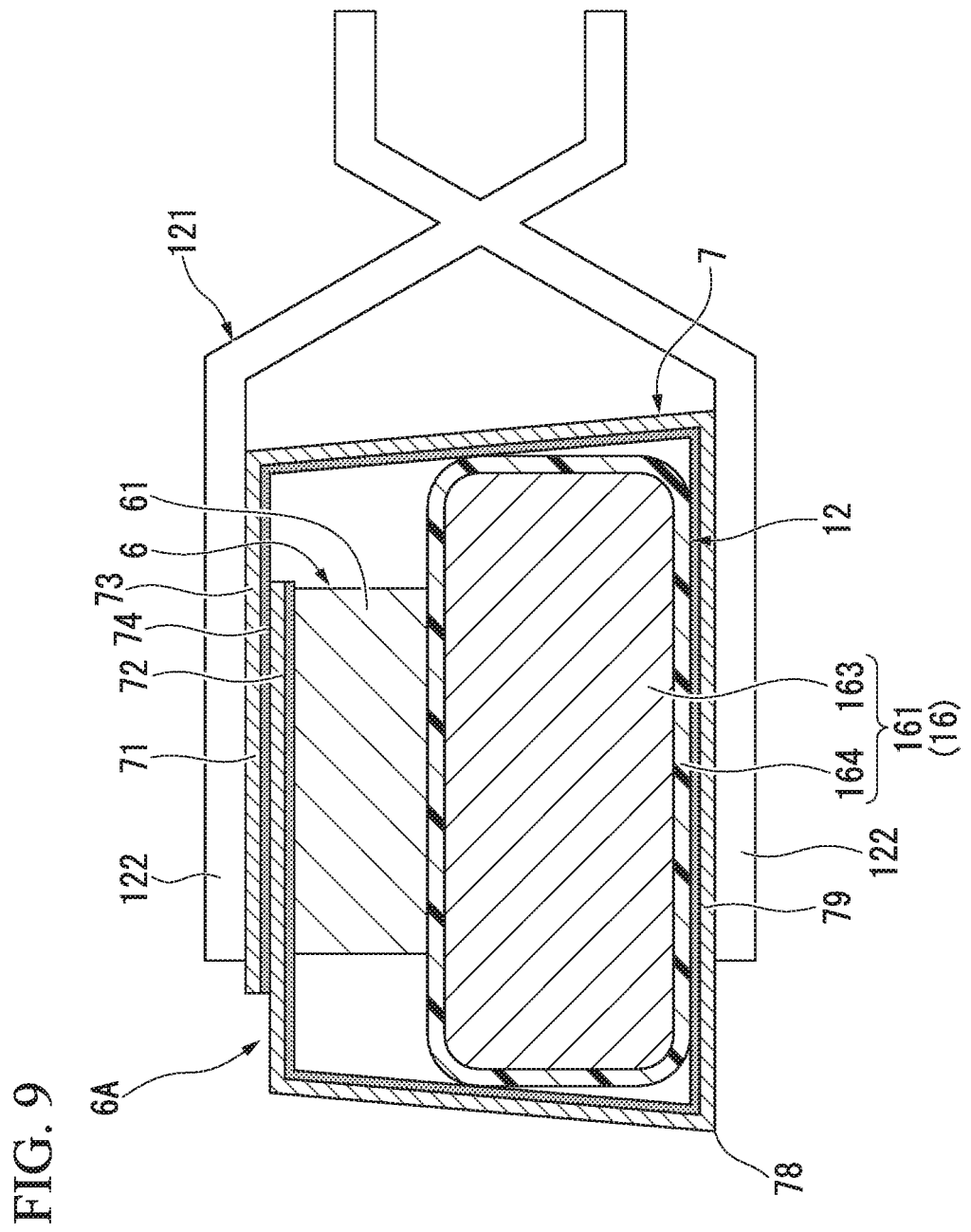
FIG. 9 is a view for explaining insulating paper adhering process of a thermistor fixing method of a fourth embodiment.

FIG. 9 is a view for explaining insulating paper adhering process of a thermistor fixing method of a fourth embodiment.

Next, the thermistor fixing method of the fourth embodiment will be described with reference to FIG. 9. Further, detailed description of the same constitutions as that of the first embodiment will be omitted.

In the insulating paper adhering process of the fourth embodiment, both of the side portions 71 and 72 of the insulating paper 7 are adhered with each other while being temporarily fixed to the detection part 61 of the thermistor 6.

In the temporary fixing of both of the side portions 71 and 72, after both of the side portions 71 and 72 are overlapped with each other at above the detection part 61, both of the side portions 71 and 72 and a facing section 79 facing both of the side portions 71 and 72 are clamped by a clip 121 (a clamping section).

The clip 121 includes a pair of clamping sections 122 and 122, and a biasing means (not shown). The pair of clamping sections 122 and 122 have base end sides that are pivotably coupled to each other. The biasing means normally biases the pair of clamping sections 122 and 122 in a clamping direction.

In the insulating paper adhering process, in the clip 121, the pair of clamping sections 122 and 122 clamps both of the side portions 71 and 72 and the facing section 79 using a biasing force of the biasing means. Accordingly, both of the side portions 71 and 72 are pressed against and temporarily fixed to the detection part 61. The clip 121 is removed from the insulating paper 7 after adhesion of both of the side portions 71 and 72. Further, the clip 121 may be configured to adjust a clamping force by adjusting a biasing force of the biasing means.

According to the thermistor fixing method of the fourth embodiment, since both of the side portions 71 and 72 are clamped and temporarily fixed by the clip 121 after both of the side portions 71 and 72 of the insulating paper 7 are overlapped with each other, both of the side portions 71 and 72 of the insulating paper 7 can be securely adhered with each other.

Fifth Embodiment

Figure 10:
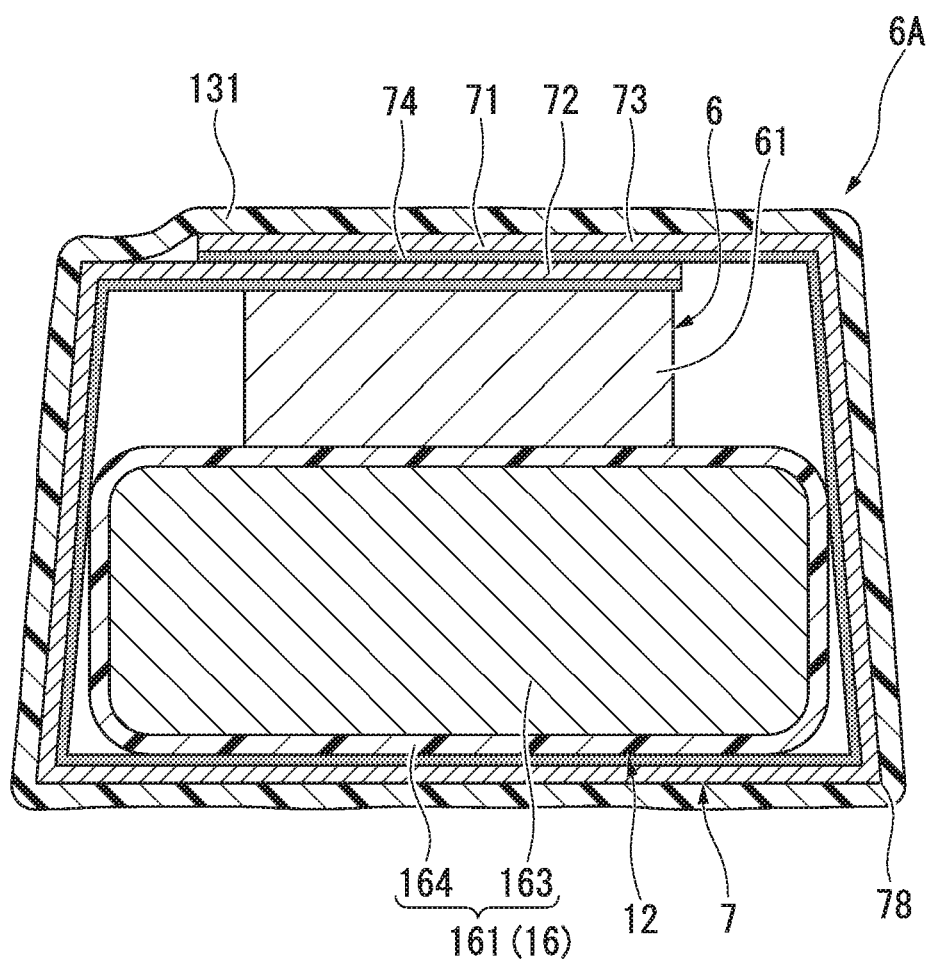
FIG. 10 is a view for explaining insulating paper adhering process of a thermistor fixing method of a fifth embodiment.

FIG. 10 is a view for explaining insulating paper adhering process of a thermistor fixing method of a fifth embodiment.

Next, the thermistor fixing method of the fifth embodiment will be described with reference to FIG. 10. Further, detailed description of the same constitutions as that of the first embodiment will be omitted.

In the insulating paper adhering process of the fifth embodiment, like the insulating paper adhering process of the fourth embodiment, both of the side portions 71 and 72 of the insulating paper 7 are adhered with each other while being temporarily fixed to the detection part 61 of the thermistor 6.

In the temporary fixing of both of the side portions 71 and 72, an annular heat-shrinkable tube 131 (a fastening section) is used. The heat-shrinkable tube 131 is a tube that is heated and shrunk. The heat-shrinkable tube 131 is formed to be fitted onto the detection part 61 of the thermistor 6 and the insulating paper 7 wound on the extending section 161 of the middle point coil 16.

In the insulating paper adhering process, after both of the side portions 71 and 72 are overlapped with each other on the detection part 61, the heat-shrinkable tube 131 is fitted onto the insulating paper 7. Next, the heat-shrinkable tube 131 is shrunk through heating. Accordingly, the heat-shrinkable tube 131 tightens the insulating paper 7. In addition, the adhesive layer 74 is heated and cured. Accordingly, the detection part 61 of the thermistor 6 is fixed while coming in contact with the extending section 161 of the middle point coil 16. Further, the heat-shrinkable tube 131 may be removed after curing of the adhesive layer 74 or may not be removed.

According to the thermistor fixing method of the fifth embodiment, after both of the side portions 71 and 72 of the insulating paper 7 are overlapped with each other, since both of the side portions 71 and 72 are tightened by the heat-shrinkable tube 131 to be temporarily fixed, both of the side portions 71 and 72 of the insulating paper 7 can be securely adhered with each other.

Further, the technical scope of the present invention is not limited to the above-mentioned embodiments and various modifications may be made without departing from the scope of the present invention.

For example, while the thermistor 6 comes in contact with and is fixed to the middle point coil 16 of the winding 12 in the above-mentioned embodiments, the thermistor 6 may come in contact with and be fixed to the bridge coils 17 or the pulling coils 18 of the winding 12.

In addition, while the case in which the heat-shrinkable tube 131 is used as an example of the fastening section has been described in the fifth embodiment, the fastening section is not limited to the heat-shrinkable tube 131. For example, a tube having an elastic force may also be used as the fastening section.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A stator comprising:
    a conductive body that is accommodated in slots of a stator core, that is mounted on the stator core, and that is formed by a plurality of segment coils that are connected with each other;
    a thermistor configured to detect a temperature of the conductive body; and
    an insulating paper that is wound on the thermistor and an outer circumference of the conductive body, the insulating paper having side portions, both side portions of the insulating paper being adhered with each other, and the insulating paper configured to fix the thermistor to the conductive body while the thermistor is in a contact state with the conductive body,
    wherein the conductive body includes a middle point coil that connects middle points of the plurality of segment coils, and
    the thermistor is fixed to the middle point coil of the conductive body by the insulating paper.

2. The stator according to claim 1,
    wherein an adhesive agent is provided on both of the side portions of the insulating paper, and
    the both of the side portions of the insulating paper are adhered with each other using the adhesive agent on both sides.

3. The stator according to claim 1,
    wherein a holder having an insulating property is provided on an outer circumferential side of the insulating paper.

4. A thermistor fixing structure comprising:
    a conductive body that is accommodated in slots of a stator core, that is mounted on the stator core, and that is formed by a plurality of segment coils that are connected with each other;

a thermistor configured to detect a temperature of the conductive body; and an insulating paper that is wound on the thermistor and an outer circumference of the conductive body, the insulating paper having side portions, both side portions of the insulating paper being adhered with each other, and the insulating paper configured to fix the thermistor to the conductive body while the thermistor is in a contact state with the conductive body, wherein the conductive body includes a middle point coil that connects middle points of the plurality of segment coils, and the thermistor is fixed to the middle point coil of the conductive body by the insulating paper.

5. A thermistor fixing method comprising:

a thermistor disposition process of disposing a thermistor to come in contact with a middle point coil of a conductive body that is accommodated in slots of a stator core, that is mounted on the stator core, and that is formed by a plurality of segment coils that are connected with each other, the middle point coil being configured to connect middle points of the plurality of segment coils;

an insulating paper winding process of wounding insulating paper on the thermistor and an outer circumference of the conductive body; and an insulating paper adhering process of fixing the thermistor to the conductive body while the thermistor is in a contact state with the conductive body by adhering both side portions of the insulating paper with each other.

6. The thermistor fixing method according to claim 5, wherein the insulating paper adhering process is performed in which the both of the side portions of the insulating paper are adhered with each other while being temporarily fixed to at least one of the thermistor and the conductive body.

7. The thermistor fixing method according to claim 6, wherein the insulating paper adhering process is performed in which the both of the side portions of the insulating paper are clamped by a clamping section so as to be temporarily fixed after the both of the side portions of the insulating paper are made to overlap with each other.

8. The thermistor fixing method according to claim 6, wherein the insulating paper adhering process is performed in which the both of the side portions of the insulating paper are tightened by a fastening section so as to be temporarily fixed after the both of the side portions of the insulating paper are made to overlap with each other.

9. The thermistor fixing method according to claim 5, wherein the insulating paper adhering process is performed in which the both of the side portions of the insulating paper are heated and cured after temporarily attaching the both of the side portions with each other by using a thermosetting adhesive agent, and the both of the side portions are adhered with each other.

* * * * *